United States Patent [19]

Lide

[11] Patent Number: 5,590,574
[45] Date of Patent: Jan. 7, 1997

[54] DRIVER WITH AUTOMATIC FASTENER FEED

[76] Inventor: Thomas E. Lide, 5205 Sportsman's Way, Jacksonville, Fla. 32244

[21] Appl. No.: 523,771

[22] Filed: Sep. 5, 1995

[51] Int. Cl.$^6$ ................................................ B25B 13/06
[52] U.S. Cl. ............................ 81/124.1; 81/125; 81/176.2
[58] Field of Search .................................. 81/124.1, 125, 81/124.2, 57.37, 431, 176.1, 176.15, 176.2

[56] References Cited

U.S. PATENT DOCUMENTS

| | | | |
|---|---|---|---|
| 1,503,692 | 8/1924 | McCarthy | 81/125 |
| 2,247,500 | 7/1941 | Hutchison, Jr. | 81/124.1 X |
| 2,248,695 | 7/1941 | Bradshaw | 81/125 X |
| 2,493,398 | 1/1950 | Fricke | 81/124.1 |
| 2,857,794 | 10/1958 | Red, Jr. | 81/124.1 X |
| 5,279,190 | 1/1994 | Goss et al. | 81/124.1 X |

*Primary Examiner*—D. S. Meislin
*Attorney, Agent, or Firm*—Arthur G. Yeager

[57] ABSTRACT

A driver with an internal stack of fasteners that feed automatically out the open end of its tubular shaft. Fasteners having spaced grooves complementally fit a plurality of inwardly protruding spaced splines in the driver shaft. The splines also engage the shaft of the fastener to position and stabilize the fastener so that it can be started into a hole. A friction catch adjacent the open shaft end engages the head to prevent inadvertent removal of the fastener from the shaft and a coil spring automatically gently urges the stack toward the open end.

18 Claims, 1 Drawing Sheet

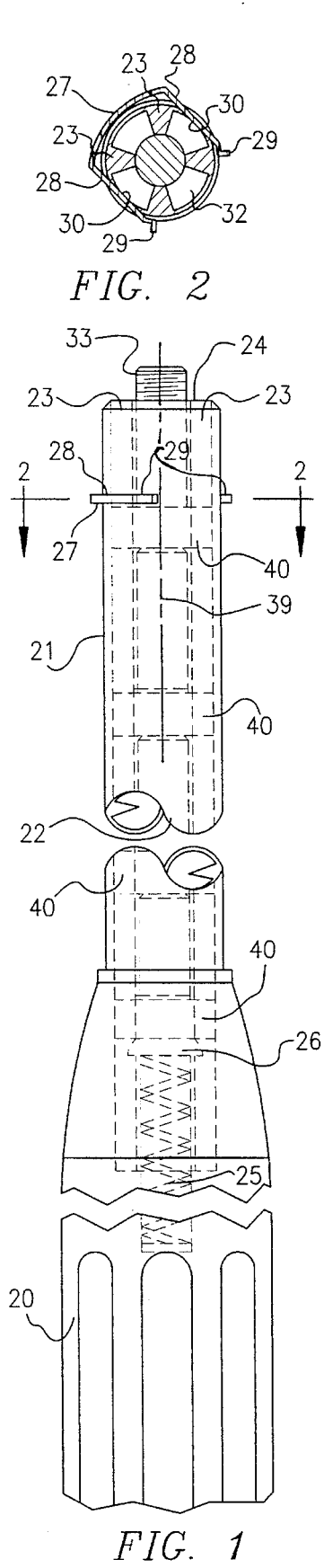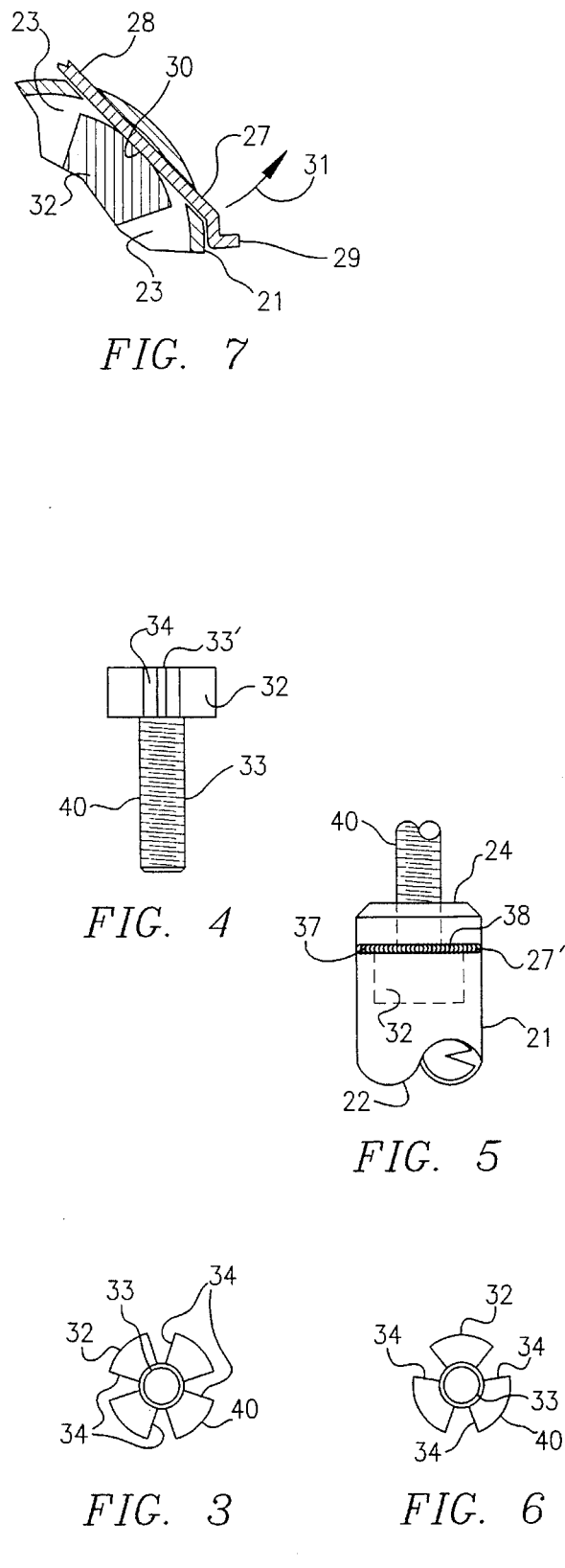

DRIVER WITH AUTOMATIC FASTENER FEED

TECHNICAL FIELD OF THE INVENTION

This invention relates to the technology of drivers for fasteners; and, more particularly, to drivers that can hold a magazine of fasteners that are fed automatically out the end of the driver shaft which is hollow and contains a plurality of inwardly facing splines to engage a plurality of spaced grooves around the head of the fastener and engage the shaft of the fastener.

BACKGROUND OF THE INVENTION

Screwdrivers are exemplary tools that have always required two hands for efficient operation; one hand holds the screw in place to enter a threaded hole while the other hand turns the screwdriver to engage the thread of the screw with the threads of the hole. In order to avoid the concurrent use of two hands, there have been attempts to place two spring biased grippers on the screwdriver so as to temporarily hold a screw against the blade of the screw driver while the operator attempts to engage the threads of the screw into the threads of the hole. Still another idea has been to magnetize the tip of the screwdriver so as to hold a steel screw onto the blade of the screwdriver until the threads of the screw are engaged with the threads of the hole. Neither of these novel ideas has met with more than minor success. The spring grippers rapidly become too loose by being sprung out of shape. The magnetized screwdriver tip has no stability to cause the screw to stand as an extension of the screwdriver shaft, and in no event is it useful with screws made of nonmagnetically attractive materials.

It is an object of the present invention to provide an automatically fed driver that is stable and easily used with one hand. It is another object of this invention to provide a driver with a hollow shaft that is internally splined and is adapted to contain an alignment of stacked fasteners whose heads are engaged with the splines and releasable from the driver shaft one at a time.

BRIEF SUMMARY OF THE INVENTION

This invention relates to a combination of a fastener and a self-feeding driver, the fastener having a longitudinal axis, a shaft with machine screw threads about the axis, and a head with a plurality of longitudinal grooves parallel to the axis and spaced circumferentially around the head and engaged with the shaft adjacent the head. The driver has a handle and an elongated tubular body disposed about the longitudinal axis, the interior of the body being fashioned with a plurality of splines parallel to the driver axis and spaced apart circumferentially. The splines and the spacing thereof are such as to fit the grooves of the fastener head and engage the shaft thereat. A plurality of the stacked fasteners may be held inside of the tubular body and be axially slidable therein. A coil spring inside the driver handle is allowed to extend and contract along the driver axis to push the fasteners out. A releasable spring catch means is provided adjacent the end of the tubular body away from the handle to stop the unintended exit of a fastener by temporarily catching the head of the fastener with the spring catch means.

In a specific preferred embodiment, the spring catch is a U-shaped length of spring wire having two parallel leg portions that lie in grooves on opposite sides of the driver shaft, the grooves being sufficiently deep, in part, to allow the leg portions to protrude within the tubular body and interfere with the free passage of fastener heads sliding by until the leg portions of the catch are sprung outwardly sufficiently far to allow the fastener head to slide therefrom.

In another specific embodiment the spring catch may be a ring of a coil spring held in a circular groove on the outside of the driver shaft, at least one portion of the groove passing through the wall of the driver shaft which provides a portion of the coil spring to interfere with the free passage of a fastener head until the interfering coil spring portion is expanded and pushed aside by force to allow the head to pass.

The driver of this invention requires special fasteners, preferably ones that have a head in order to provide space for spaced grooves that fit snugly to spaced splines and to engage a portion of a fastener shaft adjacent to a head to be held in a stable forward extending position from the driver, and not wobbly that would render difficult the engagement of thread in a mating threaded hole.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a front elevational view of the driver of this invention;

FIG. 2 is a cross-sectional view taken at 2—2 of FIG. 1 showing the U-shaped spring catch;

FIG. 3 is a bottom plan view of a fastener used with the driver of this invention;

FIG. 4 is a front elevational view of the fastener of FIG. 3;

FIG. 5 is a front elevational view of a second embodiment of the spring catch employed on the driver of this invention;

FIG. 6 is a bottom plan view of a second embodiment of a fastener that may be employed with the driver of this invention; and FIG. 7 is an expanded partial view of the spring catch of FIG. 2 showing how the catch interferes with the free passage of a screw.

DETAILED DESCRIPTION OF THE INVENTION

The features of this invention are best understood by reference to the attached drawings in which components are numbered.

In FIGS. 1, 2, and 7 the details of the driver of this invention are readily understood. The driver has a handle portion 20 and a shaft portion 21 that are joined together in a fixed or rotational relationship after the manner of screwdrivers in the prior art. Preferably the two components are fixed together with no respective rotational relationship, so that this driver is turned solely by hand power. Of course, a reversible ratchet assembly may be employed if desired. The shaft 21 is a hollow tube having a fixed attachment to the handle 20 and having an open end 24 at the location opposite to the handle 20. The hollow 22 of the tubular shaft 21 is fabricated with a plurality of lengthwise splines 23 spaced circumferentially around the inside of shaft 21. These splines 23 are parallel to the longitudinal axis 39 of shaft 21. Splines 23 extend throughout the length of shaft 21.

The internal hollow 22 of shaft 21 is filled with a linear arrangement (head-to-tail) of fasteners 40 which will be described with respect to FIGS. 3, 4 and 6. The heads of fasteners 40 are formed to fit spaced splines 23 so as to permit non-rotational sliding of fasteners 40 along the shaft 21. Spring means in the form of a coil spring 25 and follower 26 provide a small force constantly urging the enclosed fasteners 40 toward open end 24 of shaft 21 and of hollow 22.

Adjacent open end 24 of shaft 21 a spring catch means 27 interferes with the free sliding of fasteners 40 inside shaft 21 so as to prevent fasteners 40 from falling out of shaft 21 until it is desired, e.g., when fasteners 40 are engaged in a threaded hole, or the unloading of fasteners 40 from shaft 21 is intended for any other purpose. The spring catch means 27 is intended to be automatic in its restraining or catching and releasing of fasteners 40 in the normal usage of the driver of this invention.

FIGS. 2 and 7 show spaced splines 23, fitting within complemental spaced grooves 34 in the head 32 of a fastener. A U-shaped spring wire clamp means 27 having opposing parallel leg portions 28 caught in two grooves 30 on opposite sides of shaft 21. Grooves 30 are sufficiently deep so as to permit leg portions 28 of the spring clamp means 27 to be in the hollow 22 of shaft 21 and to frictionally interfere with the sliding of fastener head 32 until leg portion 28 can be sprung outward in the direction of arrow 31 (see FIG. 7). The spring catch means 27 of FIGS. 1, 2 and 7 can readily be removed from engagement with fasteners 40 by pushing outwardly on feet 29 and removing the catch means 27 temporarily from shaft 21 completely. This arrangement permits the driver of this invention to be in the position shown in FIG. 1 with a small length of fastener shaft 33 extending from open end 24 to permit the operator with one hand to turn the driver so as to engage the threads on fastener shaft 33 with internal screwthreads of a threaded hole (not shown). After initial engagement is made the driver is turned causing the fastener having end 33 to move outwardly more and more, pushing aside the spring legs 28 of the catch means 27 and allowing that fastener to be tightened into the engaged hole, and the fastener to be disengaged from splines 23. This allows the next fastener 40 inside shaft 21 to move to the ready position with spring catch means 27 holding that fastener 40 in aligned position with the longitudinal axis 39 of shaft 21 from passing until the spring legs 28 are pushed outwardly as mentioned above.

FIGS. 3 and 4 show a preferred fastener for use with the driver of this invention. The shaft 33 is threaded and is attached to head 32. The only unusual feature of the fastener is that it contains a plurality of spaced grooves 34 to match the plurality of splines 23 in driver shaft 21. The grooves 34 and splines 23 are complemental or matched in the sense that they engage one another in a sliding relationship wherein the splines are rails or guides and the grooves engage the splines 23 so as to slide lengthwise, or axially, inside the driver shaft. The invention, as shown in FIGS. 3 and 4, contemplates four equally spaced splines 23 and grooves 34. At least three should be present to provide the requisite stability and engagement between the extremities of splines 23 and the round shaft 33' from which the head 32 extends or adjacent thereto. In FIG. 7 there is depicted a fastener head 32 with three equally spaced grooves 34. More than four grooves 34 can be employed, but, practically, one would not expect to use more than four on ordinary sizes of fasteners, e.g., up to 1.0 inch in diameter.

FIG. 5 shows a second embodiment of spring catch means 27'. A ring of a fine coil spring 37 is engaged in a groove 38 encircling driver shaft 21 adjacent open end 24 of shaft 21. Groove 38 is sufficiently deep in one or more locations, preferably two or more two allow spring 37 to extend into hollow 22 and interfere with the free passage of a head 32 from the shaft 33. Here, as in the other embodiment, the interfering portions of spring 37 will be urged outwardly as the fastener is tightened into its intended threaded hole until head 32 is allowed to pass by, whereupon spring 37 will contract and interfere with the next fastener 40 inside shaft 21 being fed by spring 25.

This invention is believed to find its most favorable application with respect to machine bolts or screws, particularly small ones that are used in small spaces where it is difficult to start a screw in a threaded hole, and where a second hand to hold the screw is almost impossible to employ. Nevertheless, the driver is applicable in almost any other application where fasteners are employed, i.e., for wood screws, sheet metal screws, thread-cutting screws, etc. Of course, if downward force is required, as for wood fasteners without a predrilled somewhat conforming hole to make a good bite by the turning of the fastener, it likely would be necessary to employ a pressure member that can be applied to the uppermost fastener 40 through the handle 20 and coil spring 25 to maintain the screw 40 extended out the open end 24 and not back up into the driver shaft 21. In some constructions, the handle 20 may not be needed and the shaft 21 may be gripped and rotated. The driver can be ratcheted, motor-driven, or fixed. No limitations are intended in this invention since all possible combinations appear to be feasible using the concepts of this invention.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A combination self-feeding driver having a longitudinal axis and a fastener, said fastener having an enlarged head and a reduced elongated shaft portion with machine screw threads, said head having a plurality of grooves extending laterally to said shaft portion adjacent and spaced circumferentially around said head; said driver having an elongated tubular body disposed about said longitudinal axis, said body having an interior with a plurality of splines parallel to said longitudinal axis and spaced apart circumferentially, said splines fitting complementally said grooves of said head and engaging said shaft portion exterior of said head of said fastener while fully within said body, said body being adapted to contain a plurality of said fasteners stacked inside of said tubular body and to be axially slidable therein along said splines, said body having an open end, and releasable spring catch means adjacent said open end of said tubular body for engaging said fastener head to inhibit free passage of said fastener therefrom.

2. The combination of claim 1 wherein said grooves on said fastener heads are at least three and said spaced splines in said tubular body are at least three, said grooves and splines being substantially identical in shape and spacing so as to permit a ready sliding contact between said shaft portion of said fastener and said driver tubular body.

3. The combination of claim 1 wherein said spring catch means includes a U-shaped spring having two opposed spring leg portions and two opposed spring ends biased toward each other, said tubular body having at least one groove adapted to receive one of said spring leg portions, said groove communicating through a wall of said tubular body such that the distance between said spring portion in said groove and the inside wall of said body is less than the largest diameter of said head of said fastener.

4. The combination of claim 1 wherein said splines and grooves are alternately spaced and comprise three of each splines and grooves.

5. The combination of claim 1 wherein said tubular body includes a groove around the outside circumference thereof adjacent said open end of said tubular body, said groove extending completely through a wall of said tubular body at least in one location, said spring catch means including an encircling ring of a coil spring resting in said groove to expose a portion thereof within said interior of said body.

6. The combination of claim 5 wherein said at least in one location comprises a pair of spaced locations.

7. The combination of claim 1 further comprising a handle extending generally in alignment with said longitudinal axis.

8. The combination of claim 7 further comprising a spring means within said handle to urge said fastener toward said open end, said spring means having a force less than a engaging force on said head provided by said spring catch means.

9. The combination of claim 7 wherein said spring means includes a coil spring and a follower pad adapted to engage against an innermost fastener head in said tubular body.

10. The combination of claim 1 wherein a lateral cross section of each said spline is substantially trapezoidal.

11. The combination of claim 1 wherein said grooves and splines are alternately spaced and comprise four of each grooves and splines.

12. A driver comprising an internal magazine containing a plurality of fasteners that feed automatically out of an open end of said driver said driver including a handle affixed to a hollow internally longitudinally splined shaft with said open end permitting fasteners to protrude one at a time ready to be introduced into a threaded hole, each of said fasteners having an elongated threaded shaft portion and an enlarged head that contains lengthwise spaced grooves of a size, shape and circumferential spacing to permit said fasteners to slide lengthwise readily inside said driver shaft on said spaced splines therein, said grooves having a depth extending to said shaft portion to permit engagement of said splines with and along said shaft portion during sliding movement of each said fastener within said hollow shaft, a coil spring internally of said driver handle biased to urge said fasteners inside said shaft toward said open end, and a spring catch means adjacent said open end adapted to catch each said head successively to prevent each said fastener from inadvertently passing through said open end until said spring catch means is forced open to release said fastener head engaged thereby.

13. The driver of claim 12 wherein said driver shaft includes two opposed tangential grooves which in part are sufficiently deep to extend into said hollow of said shaft, said spring catch means including a U-shaped spring having two opposed spring leg portions fitting around said shaft with said leg portions in respective said grooves to allow said leg portions to contact respective said fastener head of said fastener extending out of said open end.

14. The driver of claim 12 wherein said spring catch means comprises a coil spring encircling said driver shaft adjacent said open end, said shaft having an encircling groove sufficiently deep at least in one circumferential location to produce an opening into said hollow of said shaft, said coil spring being seated in said encircling groove to catch said head of each passing fastener and prevent passage thereof until said coil spring is expanded.

15. The driver of claim 12 wherein said shaft includes at least three equally spaced splines and said grooves of said fasteners include at least three grooves.

16. The driver of claim 12 wherein said shaft splines and the fastener grooves are four in number and are alternately disposed within said splined shaft.

17. The driver of claim 12 wherein said splines of said splined shaft engage said fastener shaft portion along substantially the length of said shaft portion while within said hollow splined shaft.

18. The driver of claim 17 wherein said splines of said splined shaft that engage said fastener shaft portion stabilize and position said fastener with its threaded shaft portion extending out of said driver and maintain said fastener longitudinally centered with respect to said splines.

* * * * *